United States Patent
Lim et al.

(10) Patent No.: US 7,796,575 B2
(45) Date of Patent: Sep. 14, 2010

(54) METHOD AND APPARATUS FOR ORTHOGONAL FREQUENCY DIVISION MULTIPLEX

(75) Inventors: Jae Sung Lim, 667-1501 Sinnamoosil Gunyoung APT., Youngtong-dong, Youngtong-gu, Suwon-si, Gyeonggi-do, 443-749 (KR); Hyung Won Park, Gyeonggi-do (KR)

(73) Assignee: Jae Sung Lim, Suwon-Si, Gyeonggi-Do (KR)

( * ) Notice: Subject to any disclaimer, the term of this patent is extended or adjusted under 35 U.S.C. 154(b) by 593 days.

(21) Appl. No.: 11/438,308

(22) Filed: May 23, 2006

(65) Prior Publication Data

US 2006/0274710 A1 Dec. 7, 2006

(30) Foreign Application Priority Data

May 23, 2005 (KR) .................. 10-2005-0042847

(51) Int. Cl.
*H04B 7/216* (2006.01)
(52) U.S. Cl. .................. 370/342; 370/208; 370/209; 370/329; 370/335; 370/341; 455/450; 455/451; 455/452.1
(58) Field of Classification Search .................. 370/203, 370/208, 320, 335, 342, 344, 441, 209, 210, 370/328, 329, 341; 375/130, 140, 144, 141, 375/260; 455/450, 451, 452.1, 452.2
See application file for complete search history.

(56) References Cited

U.S. PATENT DOCUMENTS

| 6,314,125 B1 * | 11/2001 | Shanbhag | 375/130 |
| 6,330,287 B1 * | 12/2001 | Caso et al. | 375/295 |
| 6,590,889 B1 * | 7/2003 | Preuss et al. | 370/342 |
| 6,922,432 B2 * | 7/2005 | Callaway et al. | 375/141 |
| 2002/0154618 A1 * | 10/2002 | Kim et al. | 370/342 |
| 2003/0210647 A1 * | 11/2003 | Yang et al. | 370/208 |
| 2004/0032849 A1 * | 2/2004 | Tang et al. | 370/342 |
| 2005/0190818 A1 * | 9/2005 | Sunaga et al. | 375/130 |

OTHER PUBLICATIONS

N. Yee, J.P.M.G Linnartz and G Fettweis, "Multicarrier-Carrier CDMA in indoor wireless Radio Networks", IEEE Personal Indoor and Mobile Radio Communications (PIMRC) Int. Conference, Sep. 1993, Yokohama, Japan, pp. 109-113.*

Xuejun Sun, Ying Jiao, Chang Honghong and Zucheng Zhou, "A Synchronization scheme with less complexity on MC-CDMA systems", Vehicular Technology Conference, 2001. VTC 2001 Fall. IEEE VTS 54th, vol. 1, pp. 57-61.*

Hsiao-Hwa Chen Hsin-Wei Chiu, Generation of Perfect Orthogonal Complementary Codes for their Applications in Interference-Free CDMA Systems, Sep. 5-8, 2004, Personal, Indoor and Mobile Radio Communications, 2004. PIMRC 2004. 15th IEEE International Synposium on, vol. 1, pp. 734-738.*

* cited by examiner

*Primary Examiner*—Charles N Appiah
*Assistant Examiner*—Olumide T Ajibade Akonai
(74) *Attorney, Agent, or Firm*—Birch, Stewart, Kolasch & Birch, LLP (57) ABSTRACT

An orthogonal code including an orthogonal code set capable of a plurality of parallel processes through a cyclic shift method is provided. Moreover, a multiple access method of effectively using a new cyclic orthogonal complementary code (cyclic-OC) is provided.

18 Claims, 10 Drawing Sheets

METHOD AND APPARATUS FOR ORTHOGONAL FREQUENCY DIVISION MULTIPLEX

BACKGROUND OF THE INVENTION

1. Field of the Invention

The present invention relates to a multiple access method for each terminal to effectively communicate to each other in a network using an orthogonal frequency division multiplex (OFDM) as a physical layer.

2. Description of the Related Art

In an OFDM-Code Division Multiple Access (OFDM-CDMA) technology, users share resources through a code division multiple access. The OFDM-CDMA technology is divided into a Multi Carrier-CDMA (MC-CDMA) technology and a MC-Direct Spread-CDMA (MC-DS-CDMA) technology according to a method of transmitting a user data symbol.

In the MC-CDMA technology, the CDMA and OFDM having an excellent frequency reuse efficiency and multiple access performance are combined to spread each user data symbol in a frequency domain through respectively different orthogonal codes. Accordingly, each data symbol is converted into a spread sequence as long as an orthogonal code length, and sequentially assigned not to overlap with sub-carriers having the number identical to that of a corresponding length and then transmitted.

The MC-DS-CDMA technology includes a related art MC-CDMA CDMA technology and a DS-CDMA technology, and also spread a spread sequence in a time domain. Since the spread sequence is not spread in a frequency domain, it is transmitted through the small number of sub-carriers in the MC-DS-CDMA technology.

In a case of a down link, since all user signals received in each user are influenced by an identical channel, the MC-CDMA technology is widely used to reduce interference between user signals and also multi-users. In a case of an up link, the MC-DS-CDMA technology having a low peak to average power ratio (PAPR) is widely used to reduce interference between adjacent channels.

The OFDM-CDMA technology spread information symbol of each user in a frequency and time domain. Additionally, the OFDM-CDMA technology has high efficiency because of a high processing and diversity gain when compared to the OFDMA technology using identical error correction symbols.

In the OFDM-CDMA technology, a Walsh Hadamard code, a PN code, a Gold code, an OVSF code, etc. are used as an orthogonal code. However, the performance of the OFDM-CDMA technology can not be maximized using those orthogonal codes. Since the orthogonal codes can not be processed using a parallel code perpendicular to each other, the diversity gain, which is very important in an OFDM system performance, can not be maximized.

Additionally, since a related art spread-based system transmits data using a single spread code, a resource application strategy such as power and channel coding, which can be flexibly applied according to a state of a radio channel, is based on a single spread sequence. Accordingly, the spread-based system can not be effectively adapted to a change of a channel.

Since the entire spread sequences includes a set of respectively independent sub-spread sequences, and each sub-spread sequence can utilize a respectively different resource application strategy, a higher spectrum usage efficiency can be achieved according to the state of the radio channel.

Additionally, an equalizer is required in a receiving unit to remove interference between multi-users in the OFDM-CDMA technology. Since complexity of the equalizer depends on a code length, it is difficult to embody an efficient receiving unit through a related art orthogonal code.

As described above, it is hard to optimize a system performance through an orthogonal code in the OFDM-CDMA technology, and also embody an effective structure of a receiving unit for removing interference between multi-users. Thus, a new orthogonal code is necessary to resolve these problems.

SUMMARY OF THE INVENTION

Accordingly, the present invention is directed to a method and an apparatus for an orthogonal frequency division multiplex that substantially obviate one or more problems due to limitations and disadvantages of the related art.

An object of the present invention is to provide a new orthogonal code providing an optimized system performance through a maximum diversity gain in a system using an OFDM/CDMA method, and using a receiving unit with simple structure through an orthogonal parallel process when compared to a related art orthogonal code.

Another object of the present invention is to provide a method and an apparatus of processing data of an orthogonal division multiplex, which can apply a new orthogonal code to an OFDM-CDMA environment.

A further another object of the present invention is to provide a new multiple access method on the basis of a new orthogonal code, and also various application methods applicable to a corresponding system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method of processing data of an orthogonal frequency division multiplex in a system using an orthogonal frequency division multiplex as a physical layer, the method including: generating a spread sequence by applying a cyclic-shifted orthogonal code to an inputted data; and transmitting the generated spread sequence.

In another aspect of the present invention, there is provided a transmitting unit of an orthogonal frequency division multiplex, including: a channel coding and modulating unit channel coding and modulating an inputted data; a serial/parallel converting unit converting the modulated data into a parallel data; a data spreading unit generating a spread sequence by a cyclic-shifted orthogonal code to the parallel data inputted through the serial/parallel converting unit; a chip interleaving unit interleaving the spread sequence; an IFFT (Inverse Fast Fourier Transform) unit converting the spread sequence inputted from the chip interleaving unit into a sub-carrier; and a guard interval inserting unit inserting a guard interval into a signal inputted from the IFFT.

In a further another aspect of the present invention, there is provided a transmitting unit of an orthogonal frequency division multiplex, including: a channel coding and modulating unit channel coding and modulating an inputted data; a serial/ parallel converting unit converting the modulated data into a parallel data; a data spreading unit generating a spread sequence by a cyclic-shifted orthogonal code to the parallel data inputted through the serial/parallel converting unit; a chip interleaving unit interleaving the spread sequence; an IFFT (Inverse Fast Fourier Transform) unit converting the spread sequence inputted from the chip interleaving unit into a sub-carrier; and a guard interval inserting unit inserting a guard interval into a signal inputted from the IFFT.

In a still further another aspect of the present invention, there is provided a receiving unit of an orthogonal frequency division multiplex, including: a guard interval removing unit removing a guard interval from an inputted data; a FFT (Fast Fourier Transform) unit modulating the guard interval-removed data; a chip deinterleaving unit deinterleaving the modulated data; a data despreading unit despreading by applying a cyclic-shifted orthogonal code to the deinterleaved data; a parallel/serial converting unit converting the despread data into a serial data; and a channel decoding and modulating unit channel decoding and modulating the converted serial data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In a communication system using an OFDM, a new orthogonal code technology capable of processing data in parallel is required.

According to the present invention, there is provided a method of optimizing a network environment using a code division multiple access when users share sub-carrier-divided radio resources.

More specifically, there is provided an orthogonal code having a plurality of parallel-processing orthogonal code sets generated through a cyclic shift method, and also a multiple access method for utilizing a new cyclic orthogonal complementary (cyclic-OC) code.

The orthogonal complementary (OC) code has an auto correlation value of zero in all delays except for a zero shift, and a cross correlation value of zero in all delays (including a zero shift).

The orthogonality of the OC code maintains by a flock unit. Each flock includes a plurality of family codes. That is, each data symbol is spread into the plurality of family codes to provide the orthogonality.

At this point, when assuming that the OC code includes L number of flocks ($C_i$), one flock includes the L number of family codes ($C_{i,j}$), and the length of each family code is $L^2$.

Accordingly, the maximum L number of data or data of the L number of users can be simultaneously spread. Since the length of a spread sequence in each data symbol is identical to the length of the family code, the maximum L number of data is transmitted in the L number of spread sequences having the length of $L^2$.

However, in the OC code, the $L^3$ number of chips is required to transmit the L number of data. The number of available codes over a processing gain is small.

The cyclic-OC code is a new code generated through a cyclic shift using an OC code having correlation characteristics.

Figure 1:
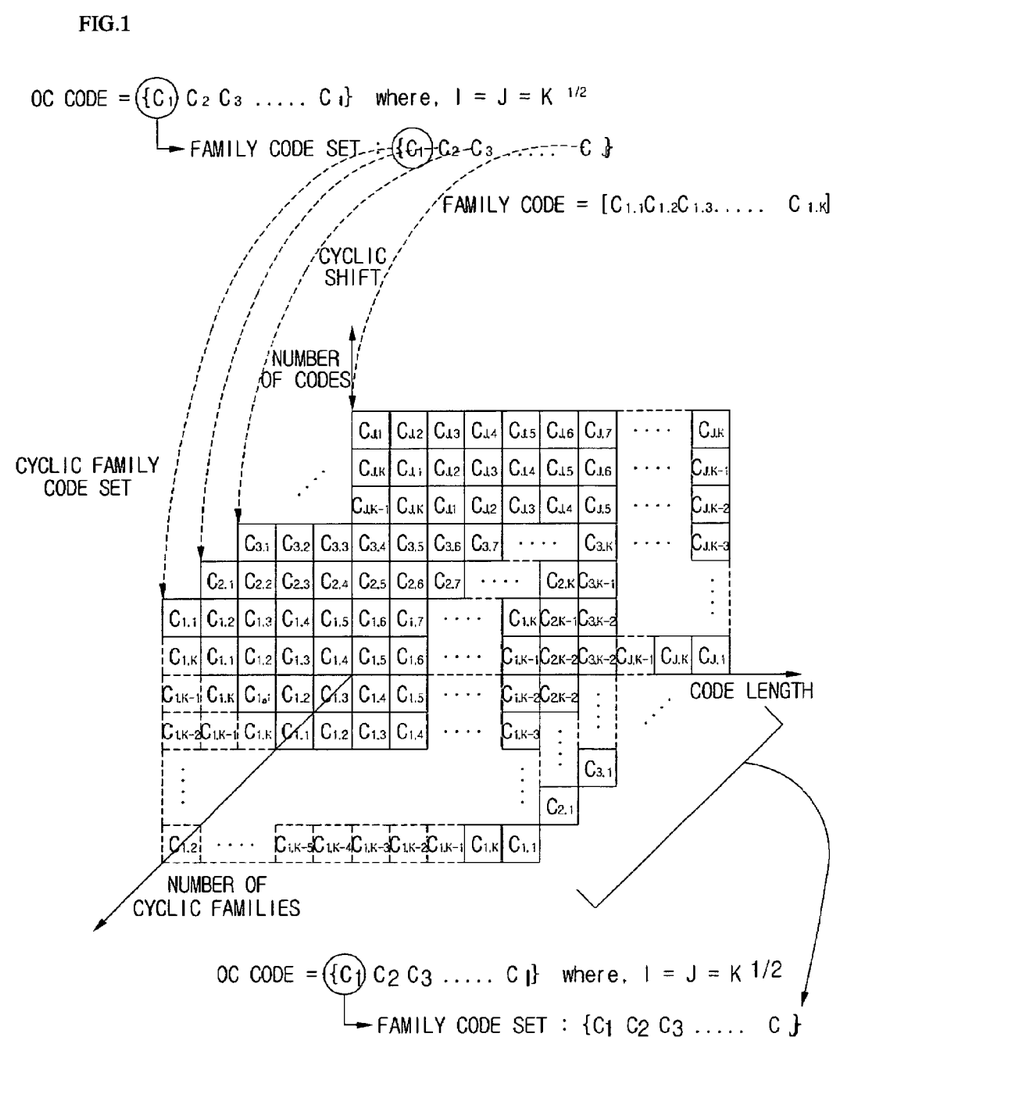
FIG. 1 is a view of a process of generating a cyclic-OC code.

FIG. 1 is a view of a process of generating a cyclic-OC code.

Because of correlation characteristics of the OC code, each spread sequence is overlapped at each chip shift, and thus can be restored to a flock unit in a receiving unit when each spread sequence is transmitted. Accordingly, when assuming that the OC code includes the L number of flocks, each flock includes the L number of successive cyclic-family code sets, and also each cyclic-family code set includes the $L^2$ number of cyclic-family codes.

Consequently, the maximum $L^3$ number of data symbols can be simultaneously transmitted using the cyclic-OC code. Additional, since the cyclic-OC code obtains the processing gain of $L^3$ through the L number of spread sequences having the $L^2$ length, the entire spread sequences can be parallel-processed with the L. An example of the cyclic-OC code having a processing gain of total 8 be described.

$C=\{_1,C_2\}$, where $C_1$ is flock.

$$C_i = \sum_{j=1}^{j=2} C_{i,j}$$

where $C_{i,j}$ is a cyclic-family code set $$C_{1,1} = \begin{pmatrix} 1 & 1 & 1 & -1 \\ -1 & 1 & 1 & 1 \\ 1 & -1 & 1 & 1 \\ 1 & 1 & -1 & 1 \end{pmatrix} \quad C_{1,2} = \begin{pmatrix} 1 & -1 & 1 & 1 \\ 1 & 1 & -1 & 1 \\ 1 & 1 & 1 & -1 \\ -1 & 1 & 1 & 1 \end{pmatrix}$$

$$C_{2,1} = \begin{pmatrix} 1 & 1 & -1 & 1 \\ 1 & 1 & 1 & -1 \\ -1 & 1 & 1 & 1 \\ 1 & -1 & 1 & 1 \end{pmatrix} \quad C_{2,2} = \begin{pmatrix} 1 & -1 & -1 & -1 \\ -1 & 1 & -1 & -1 \\ -1 & -1 & 1 & -1 \\ 1- & -1 & -1 & 1 \end{pmatrix}$$

That is, since the processing gain is 8, there are total 2 flocks, and each flock includes 2 cyclic-family code sets. The orthogonality of each data symbol is obtained using a cyclic-family code in the same row of 2 cyclic-family code sets in a specific flock. Accordingly, total 8 data symbols can be simultaneously transmitted.

$b_1$*cyclic-familycode1=$b_1$*{1 1 1 −1}+$b_1$*{1 −1 1 1}
$b_2$*cyclic-familycode2=$b_2$*{−1 1 1 1}+$b_2$*{1 1 −1 1}
$b_3$*cyclic-familycode3=$b_3$*{1 −1 1 1}+$b_3$*{1 1 1 −1}
$b_4$*cyclic-familycode4=$b_4$*{1 1 −1 1}+$b_4$*{−1 1 1 1}
$b_5$*cyclic-familycode5=$b_5$*{1 1 −1 1}+$b_5$*{1 −1 −1 −1}
$b_6$*cyclic-familycode6=$b_6$*{1 1 1 −1}+$b_6$*{−1 1 −1 −1}
$b_7$*cyclic-familycode7=$b_7$*{−1 1 1 1}+b7*{−1 −1 1 −1}
b8*cyclic-familycode8=b8*{1 −1 1 1}+b8*{−1 −1 −1 1}

Each spread sequence is overlapped each other and can be transmitted. The spread sequences generated through respectively different flocks are overlapped. At this point, the overlapping can be possible between each cyclic-family code sets.

That is, when each data is generated through $C_{1,1}$, $C_{1,2}$, $C_{2,1}$, and $C_{2,2}$, spread sequences generated from $C_{1,1}$, and $C_{2,1}$ can be overlapped, and also spread sequences generated from $C_{1,2}$ and $C_{2,2}$ can be overlapped and transmitted. Accordingly, an example of when a processing gain is 8 and the number of flocks is 2 will be described.

Spread Sequence1=$b_1$*{1 1 1 −1}+$b_2$*{−1 1 1 1}+$b_3$*{1 −1 1 1}+$b_4$*{1 1 −1 1}+$b_5$*{1 1 −1 1}+$b_6$*{1 1 1 −1}+$b_7$*{−1 1 1 1}+$b_8$*{1 −1 1 1}

Spread Sequence2=$b_1$*{1 −1 1 1}+$b_2$*{1 1 −1 1}+$b_3$*{1 1 1 −1}+$b_4$*{−1 1 1 1}+b5*{1 −1 −1 −1}+b6*{−1 1 −1 −1}+b7*{−1 −1 1 −1}+b8*{−1 −1 −1 1}

Accordingly, the cyclic-OC code has excellent characteristics in a system complexity when compared to related art orthogonal codes using each user symbol to simultaneously transmit data symbols of a code length having a number identical to that of the processing gain.

Figure 2:
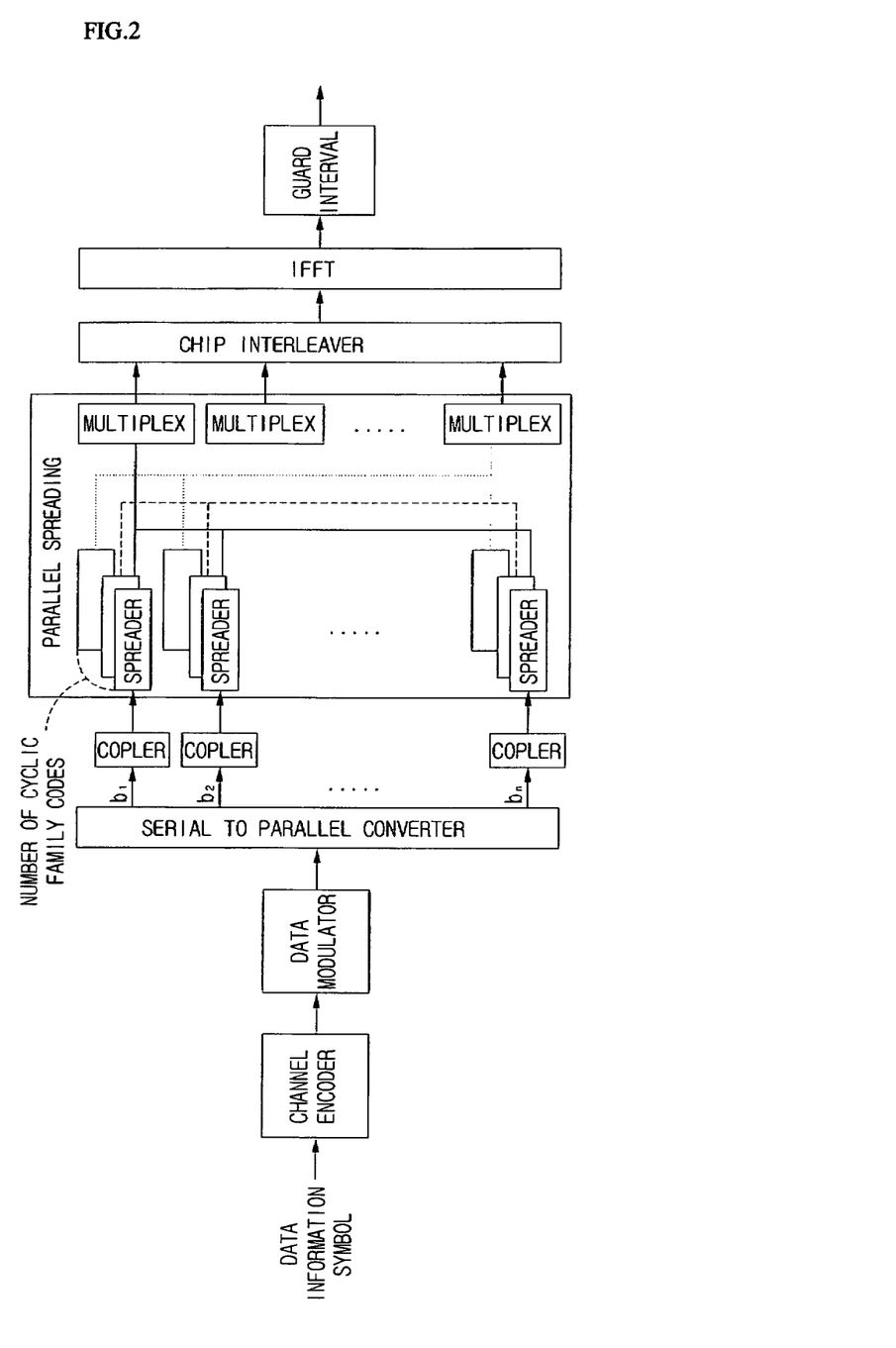
FIGS. 2 and 3 are views of a transmitting unit and a receiving unit in a system using a cyclic-OC code.
Figure 3:
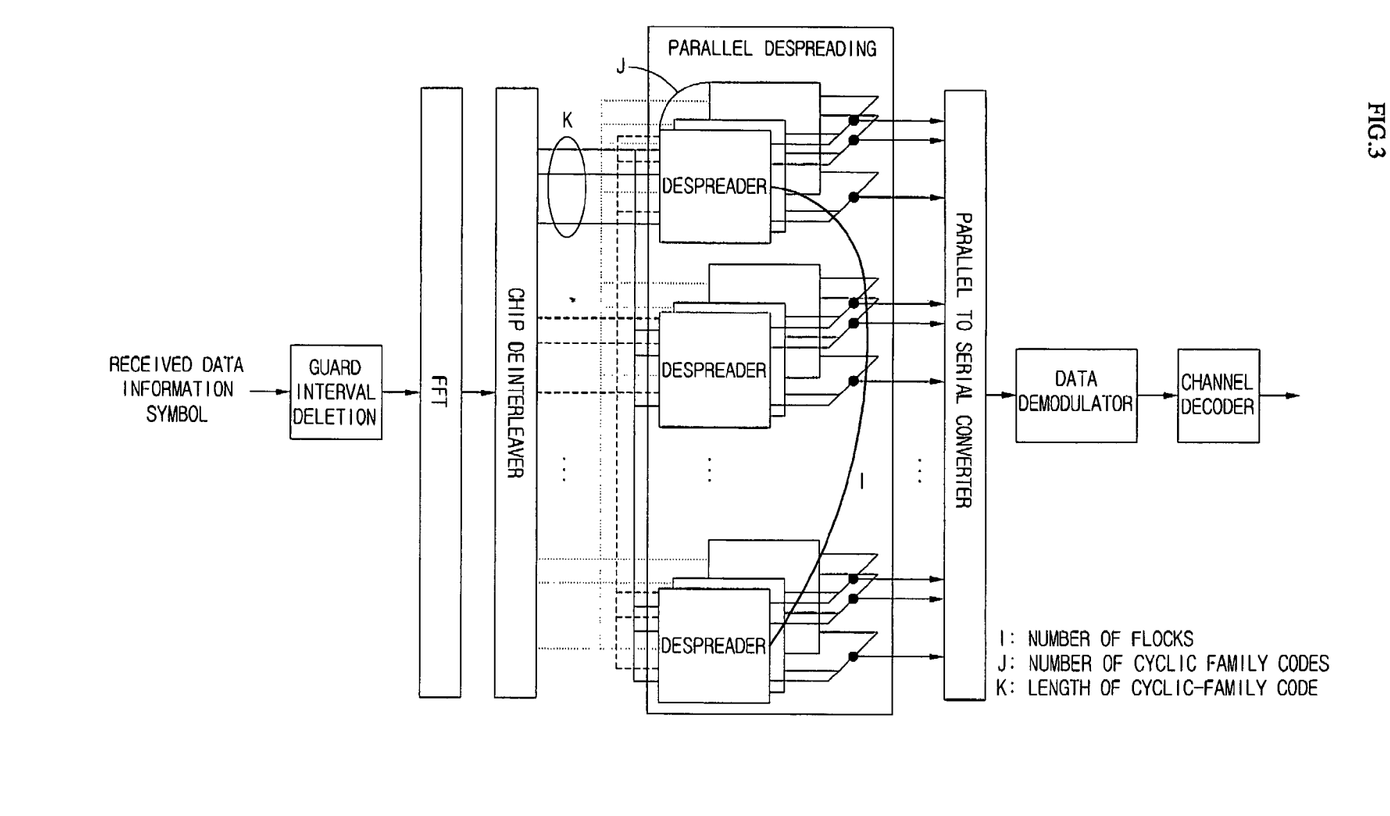

FIGS. 2 and 3 are views of a transmitting unit and a receiving unit in a system using a cyclic-OC code.

The transmitted data information symbol from a transmitting unit is channel-encoded through a channel encoding unit, and modulated through a data modulating unit. Moreover, the modulated data is passed through a serial to parallel converter S/P. In $b_n$, n represents the number of data to be transmitted, which can be identical to the maximum number of sub-carriers.

Next, each data is parallel-spread through a cyclic-shifted orthogonal code, and multiplexed.

Each data is interleaved through a chip interleaving unit, and then converted into sub-carrier in an inverse fast Fourier transform (IFFT). The sub-carrier having a guard interval inserted thereto, and then is transmitted.

On the other hand, the guard interval is removed from the received information in a receiving unit, and then Fast Fourier transformed (FFT). Then, the information is deinterleaved in a chip deinterleaving unit, and then serial-despread to be restored.

Next, the result is passed through the parallel to serial converting unit, modulated in the data demodulating unit, and then channel-decoded in a channel decoding unit.

Since parallel spreading and parallel despreading are possible through the cyclic OC code, a structure of a transmitting-receiving unit becomes simple, and also a diversity gain can be maximized.

The OC code basically includes a family code of a $4_n$ length. Accordingly, Table 1 below shows an OC code. However, the cyclic-OC code can includes the number of more various cyclic-family code sets.

Unlike the OC code, the cyclic-OC code can maintain orthogonality using a half of the number of entire flocks. When a related art code length is 16, the cyclic-OC code includes 2 flocks and 2 cyclic-families unlike the OC code having a processing gain of 64 in 4 flocks and 4 families. Accordingly, a code set configuration is possible in Table 2 below.

Accordingly, the more various cyclic-OC codes can be provided, and using this, more variable orthogonal codes can be easily provided according to an environment using an orthogonal code of the cyclic-OC code.

TABLE 1

| Code length | 4 | 16 | 64 | 256 | 1024 | 4096 | ... |
|---|---|---|---|---|---|---|---|
| Processing gain | 8 | 64 | 512 | 4096 | 32768 | 262144 | ... |
| The number of flocks | 2 | 4 | 8 | 16 | 32 | 64 | ... |
| The number of families | 2 | 4 | 8 | 16 | 32 | 64 | ... |

TABLE 2

| Code length | 4 | 4 | 16 | 16 | 64 | 64 | ... |
|---|---|---|---|---|---|---|---|
| Processing gain | 4 | 8 | 32 | 64 | 256 | 512 | ... |
| The number of flocks | 1 | 2 | 2 | 4 | 4 | 8 | ... |
| The number of families | 1 | 2 | 2 | 4 | 4 | 8 | ... |

The cyclic-OC code increases the number of orthogonal codes of an available radio resource when compared to the related OC code. For example, when there is a processing gain of 8, the related OC code provides two orthogonal codes below.

Code1={[1 1 1 −1], [1 −1 1 1]}
Code2={[1 1 −1 1], [1 −1 −1 −1]}

However, since a cyclic-family including respectively different 4 cyclic-family codes can be provided in a case of the cyclic-OC code, the 8 available orthogonal codes, which is a multiple of 2 flocks and 4 cyclic-family codes, can be provided. That is, the number of available orthogonal codes, which is double of a family code length, can be provided when compared to the related OC code.

Code1={[1 1 1 −1], [1 −1 1 1]}
Code2={[−1 1 1 1], [1 1 −1 1]}
Code3={[1 −1 1 1], [1 1 1 −1]}
Code4={[1 1 −1 1], [−1 1 1 1]}
Code5={[1 1 −1 1], [1 −1 −1 −1]}
Code6={[1 1 1 −1], [−1 1 −1 −1]}
Code7={[−1 1 1 1], [−1 −1 1 −1]}
Code8={[1 −1 1 1], [−1 −1 −1 1]}

Through the cyclic-OC code having a structure above, each data symbol can be divided into a plurality of independent sub-spread sequences, and then transmitted. Additionally, improved performance can be achieved according to a resource application of an independent sub-spread sequence.

FIGS. 2 through 5 are views of a structure in a receiving unit and a transmitting unit performing a resource application of an independent sub-spread sequence when using the cyclic-OC code. FIGS. 2 and 3 are views of a structure in a receiving unit and a transmitting unit of a chip interleaving method at each sub-spread sequence equalizing an influence of a radio channel without additional channel information.

Figure 4:
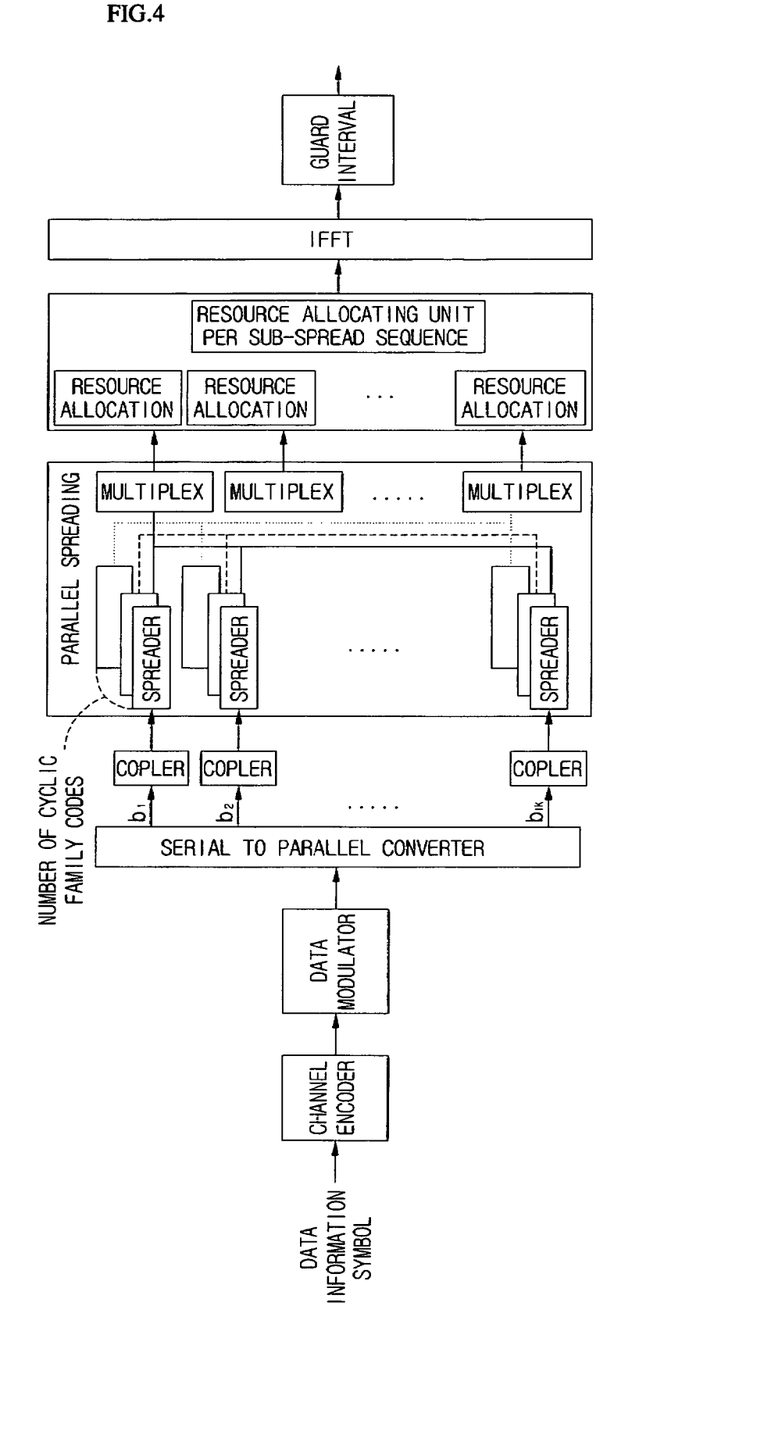
FIGS. 4 and 5 are views of a transmitting unit and a receiving unit supporting a resource allocation per sub-spread sequence to maximize an usage efficiency of a radio channel with a radio channel information.
Figure 5:
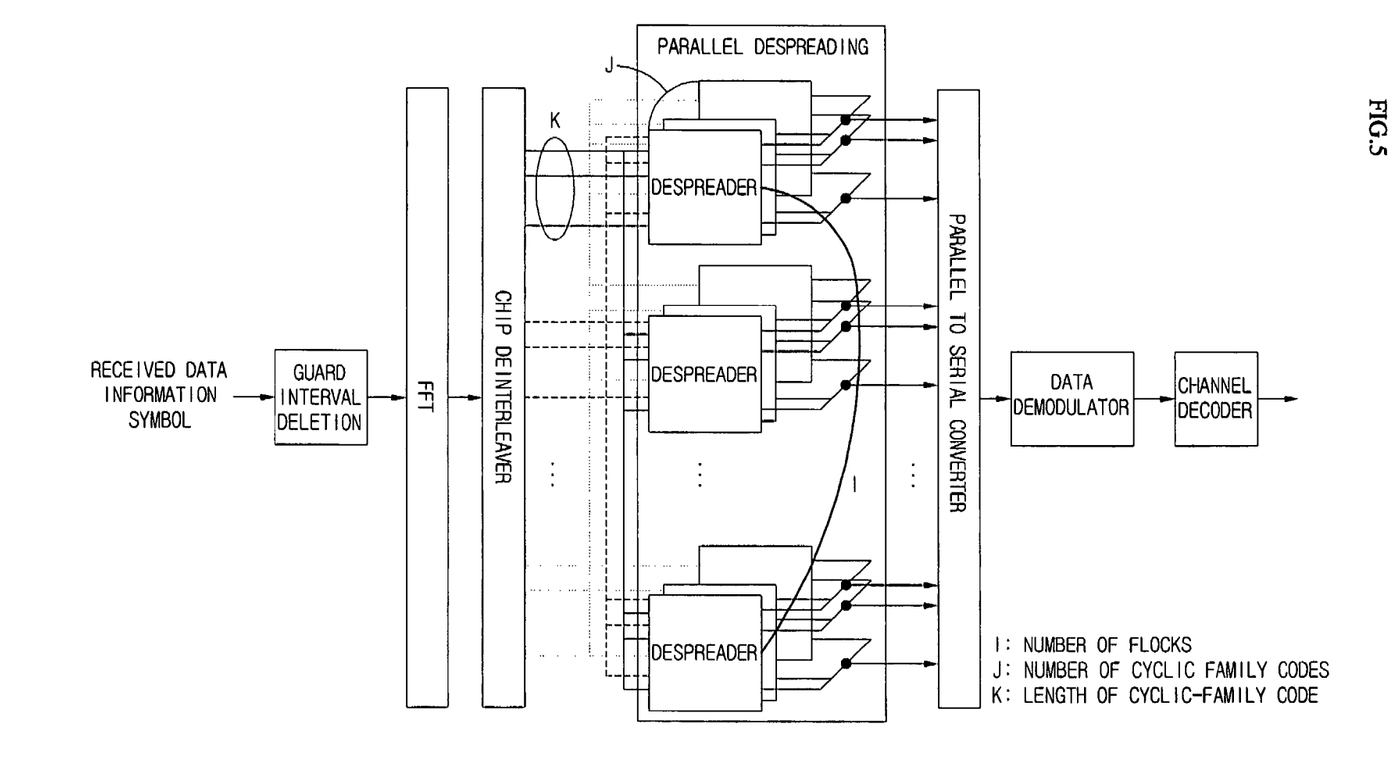

FIGS. 4 and 5 are views of a structure in a receiving unit and a transmitting unit supporting a resource allocation at each sub-spread sequence to maximize a usage efficiency of a radio channel when the transmitting unit and the receiving unit have a radio channel information.

Referring to FIG. 4, a resource allocating unit per each sub-spread sequence for a resource allocation is formed instead of a chip interleaving unit for data interleaving unlike FIG. 2.

The resource allocating unit at each sub-spread sequence can allocate another power to each sub-spread sequence according to a radio channel state.

Figure 6:
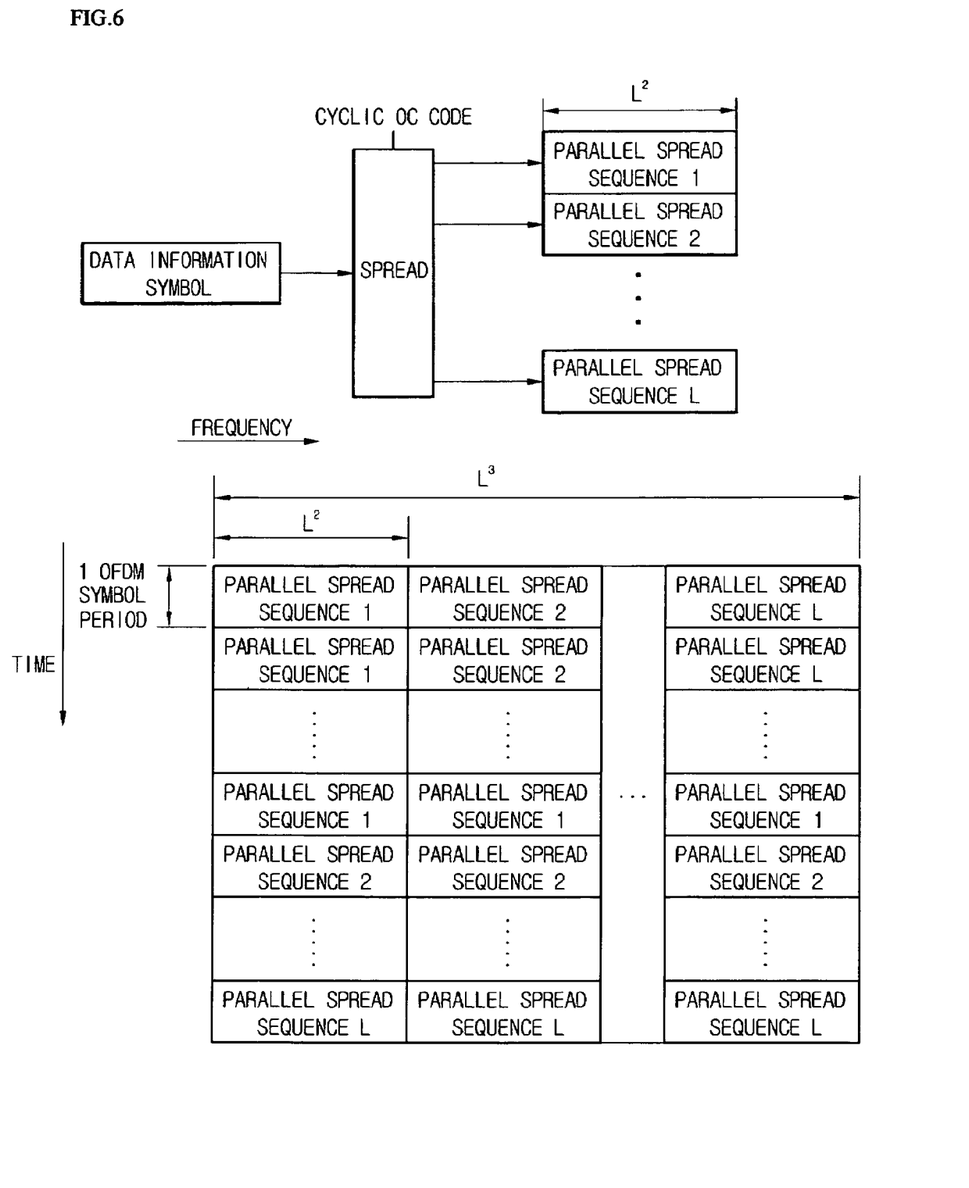
FIGS. 6 to 8 are views illustrating a method of how to be applied in a multiple carrier system when a spread sequence generated using a cyclic-OC code is spread in a frequency domain, a time domain, and a frequency/time domain, respectively.
Figure 7:
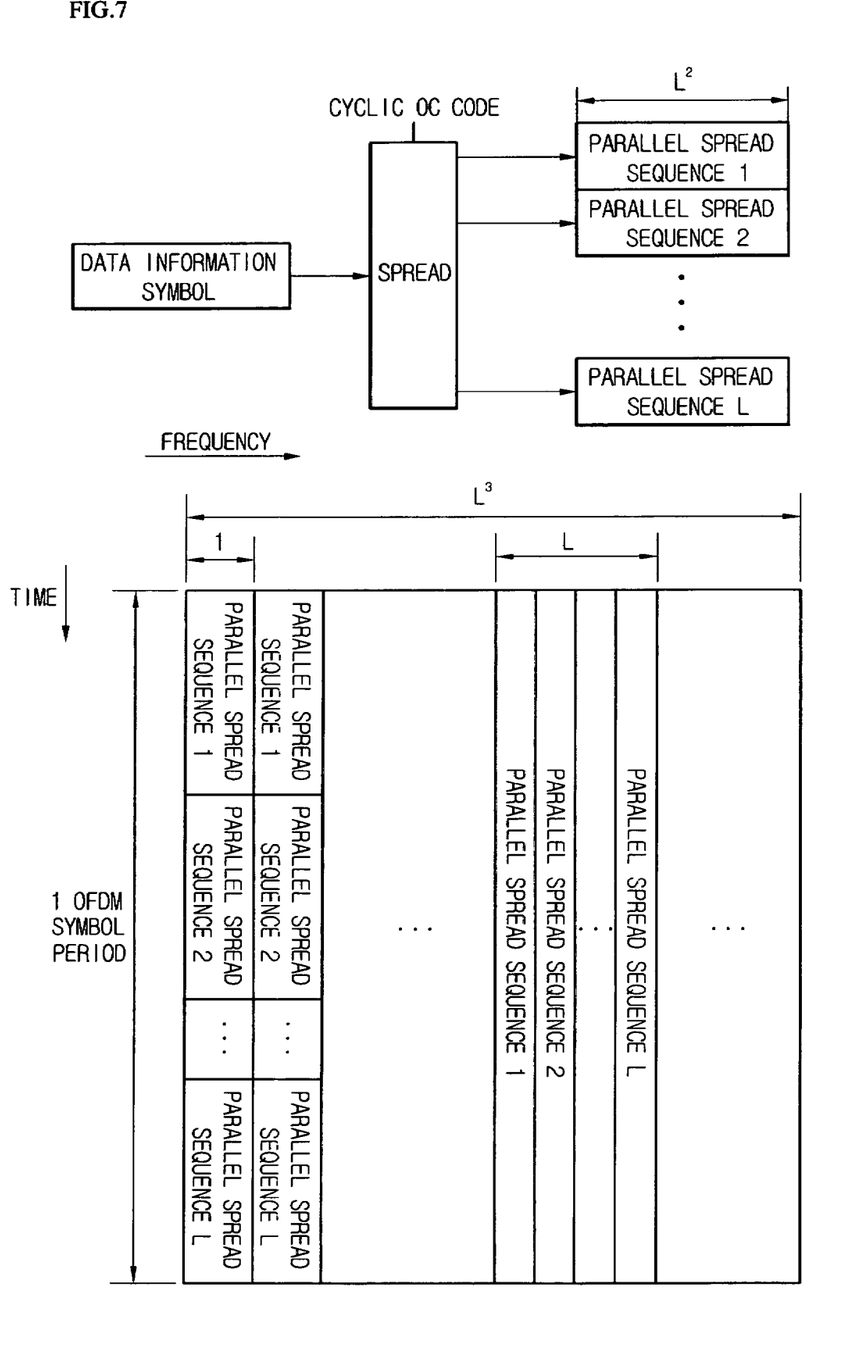
Figure 8:
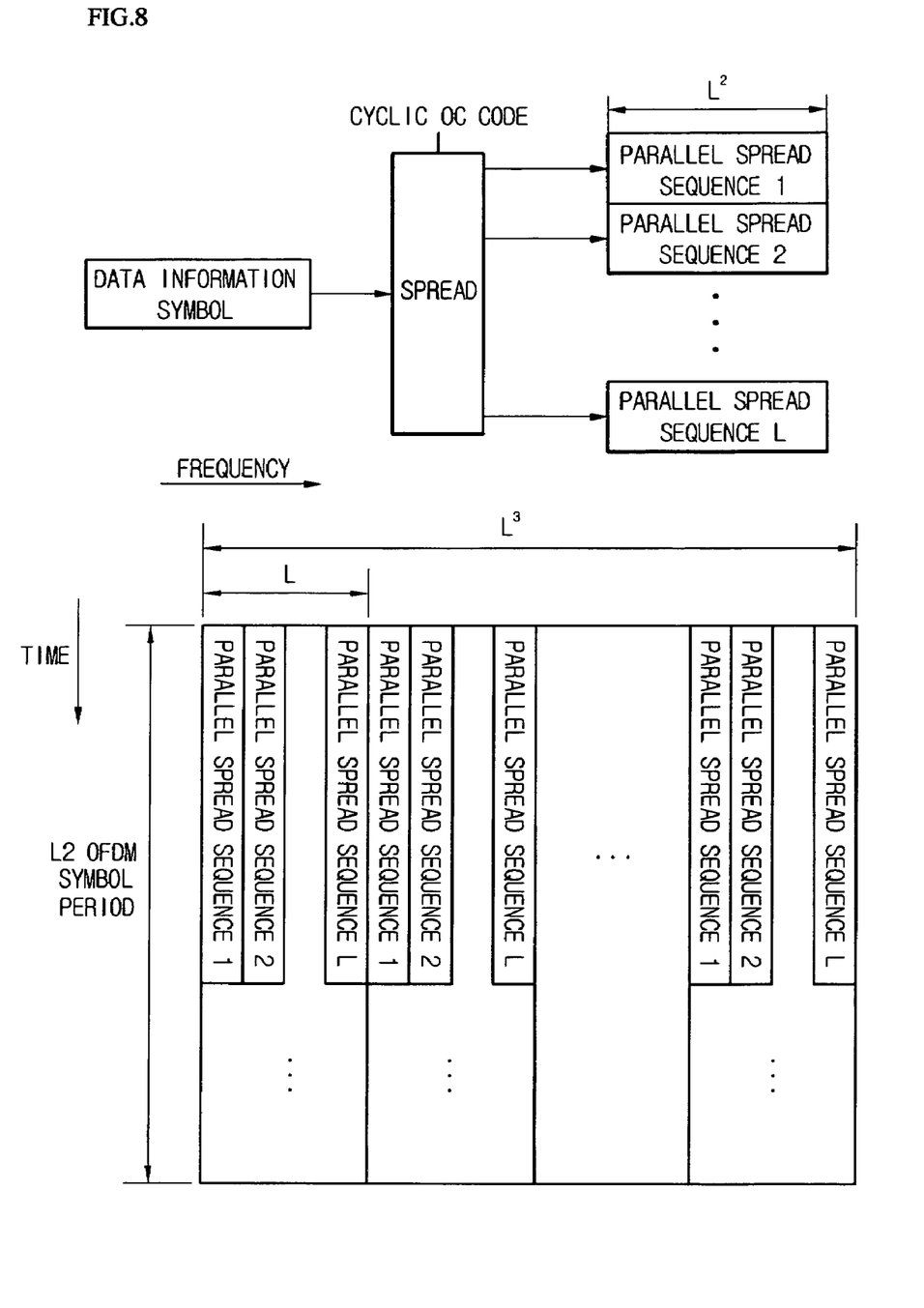

FIGS. 6 through 8 are views of an applied method when a spread sequence generated from the cyclic-OC code is spread in a frequency domain, a time domain, and a frequency/time domain through a multi carrier system.

When assuming that the number of cyclic-family code sets is L, and the length of each cyclic-family code is $L^2$, the maximum $L^3$ number of data symbols can be simultaneously transmitted. The $L^3$ number of data symbols is spread in a parallel spread sequence having the L number with a L2 length. That is, the generated parallel spread sequence can be transmitted in a frequency domain, a time domain, and a frequency/time domain according to a domain selection.

FIG. 6 is view of when a spread sequence is spread in a frequency domain.

The entire sub-carrier is divided into the $L^2$ number of sub-carrier group. An overlapped spread sequence is transmitted using the L number of sub-carrier group. A parallel spread sequence can be transmitted in one group during a several symbol time.

FIG. 7 is view of when a spread sequence is spread in a time domain.

The generated L number of parallel spread sequence is spread in a time domain during one symbol period. Additionally, $L^2$ chip can be transmitted in a time domain through the L number of sub-carriers.

FIG. 8 is view of when a spread sequence is spread in a frequency and time domain.

Consequently, data information of each user can be parallel-transmitted in a sub spread sequence having a number identical to that of the respectively independent cyclic-family code sets regardless of frequency and time domain spreading. Diversity gain can be improved through a chip interleaving between a plurality of respectively independent sub-spread sequences. When using a Hadamard code, a channel influence is equalized to an entire one code, but additional diversity gain is achieved through a chip interleaving between respectively independent sub-spread sequences in a parallel spread system using the cyclic-OC code.

When using the cyclic-OC code, the processing gain is expressed by a multiple of the number of cyclic-family code sets and a cyclic-family code length. In a system obtaining an identical pressing gain, the cyclic-OC code maximizes a diversity gain by additionally interleaving a spread sequence having a number identical to that of respectively independent cyclic-family code sets. Therefore, the cyclic-OC code is more excellent than a related art Walsh Hadamard code using one code to maintain orthogonality.

For example, in a case of the Walsh Hadamard code obtaining the processing gain of 64, one spread sequence is transmitted using sub-carriers of 64 through one code having the length of 64 to obtain the processing gain of 64. In a case of the cyclic-OC code, four spread sequences having a length of 16 is interleaved each other and transmitted.

When using sub-carriers of 64 in a case of a related art orthogonal code like Walsh Hadamard code, an interleaving effect can be obtained. However, when using the cyclic-OC code to transmit respectively independent parallel spread sequence, the diversity gain is maximized. When a Walsh Hadamard code includes 4 codes having the length of 16 to obtain a processing gain of 64, the number of data symbols, which can be transmitted simultaneously, becomes 16. Thus, a system capacity decreases proportional to the number of codes. This code is repeatedly generated through a predetermined rule, and a parallel spreading is impossible because identical codes are generated in a divided code set when dividing an entire code.

Figure 9:
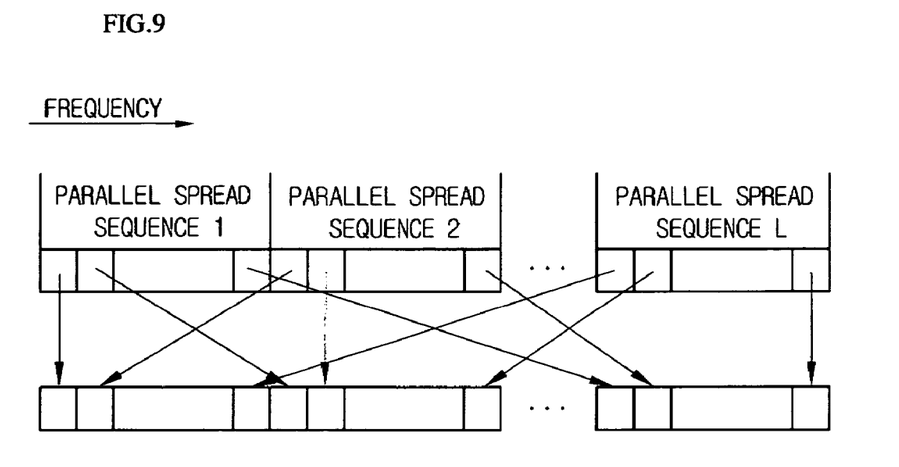
FIGS. 9 and 10 are views of chip interleaving available in a system using a cyclic-OC code.
Figure 10:
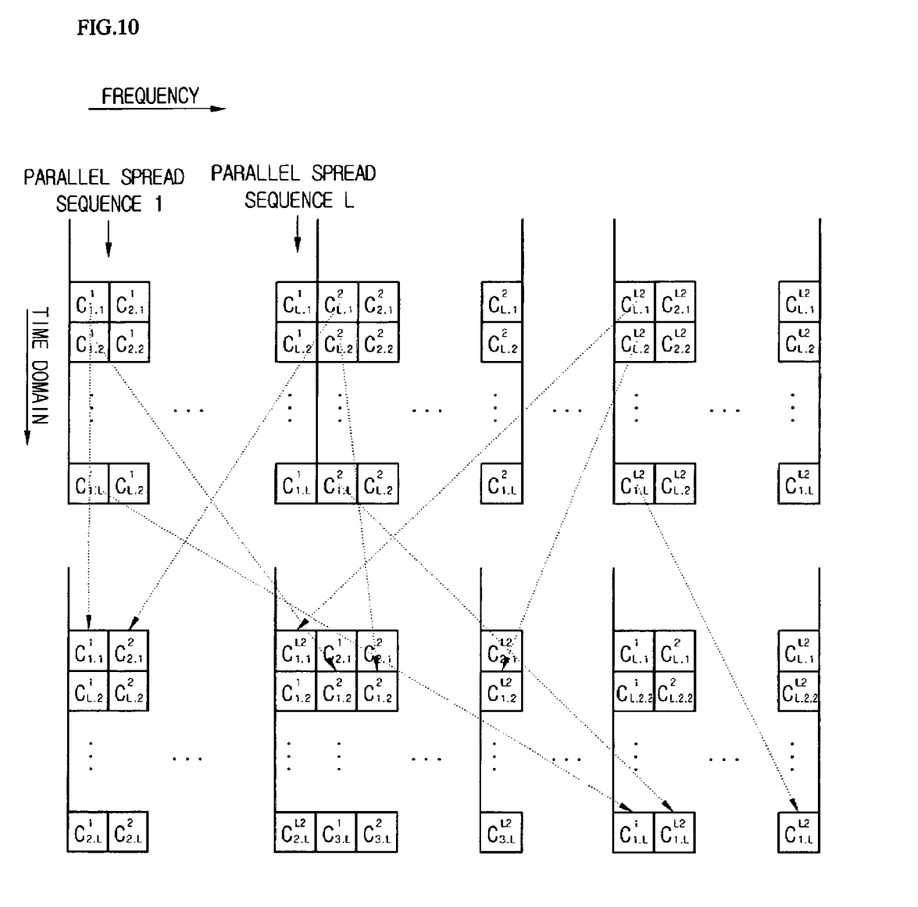

FIGS. 9 and 10 are views of chip interleaving available in a system using a cyclic-OC code.

A spread sequence generated from the cyclic-OC code can be transmitted in a frequency domain, a time domain, and a frequency and time domain, and thus a chip interleaving can be applied to a frequency domain and a time domain.

FIG. 9 is a view of a chip interleaving in a frequency domain. FIG. 10 is a view of a chip interleaving in a frequency and time domain. Additionally, random interleaving can be possible in a time and frequency domain.

Data transmitted using the cyclic-OC code is transmitted in respectively different parallel spread sequences. The diversity gain can be achieved, and also a structure of a transmitting unit and a receiving unit having a complexity according to the code length becomes simple.

Especially, a multi user detection (MUD) system for reducing a MAI of a receive signal in a receiving unit has complexity that increases proportional to a square of the code length. Accordingly, when the code length becomes longer, it is hard to embody. However, the cyclic-OC code is transmitted in a parallel spread sequence.

When the related Walsh Hadamard code is transmitted in a code length of 64, the cyclic-OC code is transmitted in 4 codes having a length of 16. Therefore, a structure of a transmitting unit and receiving unit becomes simple when compared to the related Walsh Hadamard code, and also a complex MUD system can be easily embodied.

Additionally, since each parallel spread sequence is independent, a gain is achieved in a channel usage aspect. That is, resource allocation such as adaptive modulation and coding (AMC) and power allocation is operated on the basis of an entire code in a related Hadamard code-based single spread method. This has limitation in obtaining a high channel usage efficiency in a radio mobile communication environment in which a channel state is drastically changed in frequency, time, and space.

Since each spread sequence is transmitted in a plurality of independent sub-spread sequences, each sub-spread sequence can have respectively different resource operating strategy. That is, when an amount of resource necessary to transmit each sub-spread sequence is adjusted to a coherence band width and time of a channel, a power allocation and AMC technique can be applicable on the basis of a channel response in a plurality of independent parallel channels. When the chip interleaving technique in the parallel spread system equalizes a channel environment at each sub-spread sequence, a power resource per each sub-spread sequence and an AMC technique can be applied to maximize a radio channel usage. The development and application plan of cyclic-OC code applicable to multi carrier-based system using a code division multiple access method, and a multiple access method and an application plan using a corresponding code are provided. Data symbol of each user is transmitted in a respectively orthogonal parallel spread sequence.

Therefore, a diversity gain can be maximized through a code interleaving between sub-spread sequences. Additionally, a spectrum usage efficiency can be increased by applying an independent channel application strategy according to a channel state. Therefore, the cyclic-OC code can be applied to systems multiplexed in a frequency domain, a time domain, and a frequency and time domain.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of processing data of an orthogonal frequency division multiplex in a system using an orthogonal frequency division multiplex as a physical layer, the method comprising:

generating a cyclic-shifted orthogonal complementary code, wherein the cyclic-shifted orthogonal complementary code comprises a plurality of flocks, a plurality of cyclic-family code sets in each flock, and a plurality of cyclic-family codes in each cyclic-family code set, and wherein the cyclic-shifted orthogonal complementary code is generated by parallel chip shifting family codes of orthogonal complementary codes;

generating spread sequences by multiplying the cyclic-shifted orthogonal complementary code to inputted data symbols;

overlapping spread sequences generated through respectively different flocks; and transmitting the overlapped spread sequences.

2. The method according to claim 1, wherein a corresponding spread sequence has an auto correlation value of zero for all delays except for a zero shift, and a cross correlation value of zero for all delays including the zero shift.

3. The method according to claim 1, wherein orthogonality of the cyclic-shifted orthogonal complementary code maintains by a flock unit.

4. The method according to claim 1, wherein the cyclic-shifted orthogonal complementary code comprises an available cyclic-shifted orthogonal complementary code that is cyclic-shifted as long as a code length.

5. The method according to claim 1, wherein a code length of the cyclic-shifted orthogonal complementary code is smaller than a processing gain of the cyclic-shifted orthogonal complementary code.

6. A transmitting unit of an orthogonal frequency division multiplex, comprising:

a channel coding and modulating unit channel coding and modulating an inputted data;

a serial/parallel converting unit converting the modulated data into a parallel data;

a data spreading unit generating a cyclic-shifted orthogonal complementary code, wherein the cyclic-shifted orthogonal complementary code comprises a plurality of flocks, a plurality of cyclic-family code sets in each flock, and a plurality of cyclic-family codes in each cyclic-family code set, wherein the cyclic-shifted orthogonal complementary code is generated by parallel chip shifting family codes of orthogonal complementary codes, and generating spread sequences by multiplying the cyclic-shifted orthogonal complementary code to the parallel data inputted through the serial/parallel converting unit and overlapping the spread sequences generated through respectively different flocks;

a chip interleaving unit interleaving the spread sequence from the data spreading unit;

an IFFT (Inverse Fast Fourier Transform) unit converting the spread sequence inputted from the chip interleaving unit into a sub-carrier; and a guard interval inserting unit inserting a guard interval into a signal inputted from the IFFT.

7. The transmitting unit according to claim 6, wherein a corresponding spread sequence has an auto correlation value of zero for all delays except for a zero shift, and a cross correlation value of zero for all delays including the zero shift.

8. A receiving unit of an orthogonal frequency division multiplex, comprising:

a guard interval removing unit removing a guard interval from an inputted data, wherein the inputted data includes a spread sequence by generating a cyclic-shifted orthogonal complementary code, wherein the cyclic-shifted orthogonal complementary code comprises a plurality of flocks, a plurality of cyclic-family code sets in each flock, and a plurality of cyclic-family codes in each cyclic-family code set, wherein the cyclic-shifted orthogonal complementary code is generated by parallel chip shifting family codes of orthogonal complementary codes, and multiplying the cyclic-shifted orthogonal complementary code to a parallel data, and overlapping the spread sequences generated through respectively different flocks;

a FFT (Fast Fourier Transform) unit modulating the guard interval-removed data;

a chip deinterleaving unit deinterleaving the modulated data;

a data despreading unit despreading by applying a cyclic-shifted orthogonal complementary code to the deinterleaved data;

a parallel/serial converting unit converting the despread data into a serial data; and a channel decoding and modulating unit channel decoding and modulating the converted serial data.

9. A method of processing data of an orthogonal frequency division multiplex in a system using an orthogonal frequency division multiplex as a physical layer, the method comprising:

converting a serial data into a parallel data through a serial/parallel converting unit;

generating a cyclic-shifted orthogonal complementary code, wherein the cyclic-shifted orthogonal complementary code comprises a plurality of flocks, a plurality of cyclic-family code sets in each flock, and a plurality of cyclic-family codes in each cyclic-family code set, wherein the cyclic-shifted orthogonal complementary code is generated by parallel chip shifting family codes of orthogonal complementary codes, generating spread sequences by multiplying the cyclic-family code of a cyclic-shifted orthogonal complementary code to the parallel data;

overlapping spread sequences generated through respectively different flocks; and transmitting the overlapped spread sequences.

10. The method according to claim 9, wherein the transmitting of the spread sequences transmits as many as the number of the cyclic-family code sets in parallel.

11. The method according to claim 9, wherein the transmitting of the spread sequences are spread and transmitted in a frequency domain.

12. The method according to claim 9, wherein the transmitting of the spread sequences are spread and transmitted in a time domain.

13. The method according to claim 9, wherein the transmitting of the spread sequences are spread and transmitted simultaneously in a frequency and time domain.

14. The method according to claim 9, wherein the transmitting of the spread sequences are interleaved and transmitted in a time domain.

15. The method according to claim 9, wherein the transmitting of the spread sequences are interleaved and transmitted in a frequency domain.

16. The method according to claim 9, wherein the transmitting of the spread sequences are interleaved and transmitted in a time and frequency domain.

17. A method of processing data of an orthogonal frequency division multiplex in a system using an orthogonal frequency division multiplex as a physical layer, the method comprising:

generating a cyclic-shifted orthogonal complementary code, wherein the cyclic-shifted orthogonal complementary code comprises a plurality of flocks, a plurality of cyclic-family code sets in each flock, and a plurality of cyclic-family codes in each cyclic-family code set, wherein the cyclic-shifted orthogonal complementary code is generated by parallel chip shifting family codes of orthogonal complementary codes;

generating spread sequences by multiplying the chip-shifted orthogonal complementary code to an inputted data and overlapping spread sequences generated through respectively different flocks; and transmitting the overlapped spread sequences.

18. A transmitting unit of an orthogonal frequency division multiplex, comprising:

a channel coding and modulating unit channel coding and modulating an inputted data;

a serial/parallel converting unit converting the modulated into a parallel data;

a data spreading unit generating a cyclic-shifted orthogonal complementary code, wherein the cyclic-shifted orthogonal complementary code comprises a plurality of flocks, a plurality of cyclic-family code sets in each flock, and a plurality of cyclic-family codes in each cyclic-family code set, wherein the cyclic-shifted orthogonal complementary code is generated by parallel chip shifting family codes of orthogonal complementary codes, and generating spread sequences by multiplying the cyclic-shifted orthogonal complementary code to the parallel data inputted through the serial/parallel converting unit and overlapping the spread sequences generated through respectively different flocks;

a resource allocating unit allocating a resource per each sub-spread sequence to the spread sequence generated from the data spreading unit;

an IFFT unit converting the spread sequence inputted from the data spreading unit into a sub-carrier; and a guard interval inserting unit inserting a guard interval into a signal inputted from the IFFT.

* * * * *